United States Patent
Tsai et al.

(10) Patent No.: US 10,663,735 B2
(45) Date of Patent: May 26, 2020

(54) HEAD-MOUNTED DISPLAY (71) Applicant: Coretronic Corporation, Hsin-Chu (TW)

(72) Inventors: Chih-Hsien Tsai, Hsin-Chu (TW); Chi-Tang Hsieh, Hsin-Chu (TW); Haw-Woei Pan, Hsin-Chu (TW)

(73) Assignee: Coretronic Corporation, Hsin-CHu (TW)

( * ) Notice: Subject to any disclaimer, the term of this patent is extended or adjusted under 35 U.S.C. 154(b) by 0 days.

(21) Appl. No.: 16/533,817

(22) Filed: Aug. 7, 2019

(65) Prior Publication Data

US 2019/0361243 A1   Nov. 28, 2019

Related U.S. Application Data (63) Continuation of application No. 15/414,629, filed on Jan. 25, 2017, now Pat. No. 10,429,650.

(30) Foreign Application Priority Data

Jan. 28, 2016   (TW) .............................. 105102611 A (51) Int. Cl.
| | |
|---|---|
| *G02F 1/137* | (2006.01) |
| *G02B 27/01* | (2006.01) |
| *G02B 3/08* | (2006.01) |
| *G02F 1/1335* | (2006.01) |
| *G02B 27/12* | (2006.01) |
| *G02F 1/29* | (2006.01) |

(52) U.S. Cl.
CPC ........... *G02B 27/0172* (2013.01); *G02B 3/08* (2013.01); *G02B 27/123* (2013.01); *G02F 1/137* (2013.01); *G02F 1/133526* (2013.01); *G02B 2027/0123* (2013.01); *G02F 2001/294* (2013.01); *G02F 2203/01* (2013.01)

(58) Field of Classification Search
CPC ....................................................... G02F 1/137
See application file for complete search history.

(56) References Cited

U.S. PATENT DOCUMENTS

| | | | | |
|---|---|---|---|---|
| 6,177,966 | B1 * | 1/2001 | Masuda | ............. G02B 27/0172 349/8 |
| 2004/0108971 | A1 | 6/2004 | Waldern et al. | |
| 2013/0021226 | A1 | 1/2013 | Bell | |
| 2014/0153102 | A1 * | 6/2014 | Chang | ................ G02B 27/0172 359/630 |

FOREIGN PATENT DOCUMENTS

| | | |
|---|---|---|
| CN | 1985317 | 6/2007 |
| CN | 103364951 | 10/2013 |
| CN | 103852891 | 6/2014 |
| TW | 201435392 | 9/2014 |

* cited by examiner

*Primary Examiner* — Edmond C Lau
(74) *Attorney, Agent, or Firm* — JCIPRNET (57) ABSTRACT

A head-mounted display including a transparent display, a main liquid crystal lens and a first liquid crystal lens is provided. The transparent display is configured to emit an image light beam. The main liquid crystal lens is disposed near the transparent display. The transparent display is disposed between the main liquid crystal lens and the first liquid crystal lens. The first liquid crystal lens is configured to receive an ambient light beam. The head-mounted display allows at least a part of the image light beam emitted from the transparent display passing through a pupil by phase modulating of at least a part of the main liquid crystal lens.

12 Claims, 5 Drawing Sheets

HEAD-MOUNTED DISPLAY

CROSS-REFERENCE TO RELATED APPLICATION

This application is a continuation application of and claims the priority benefit of a prior application Ser. No. 15/414,629, filed on Jan. 25, 2017. The prior application Ser. No. 15/414,629 claims the priority benefit of Taiwan application serial no. 105102611, filed on Jan. 28, 2016. The entirety of each of the above-mentioned patent applications is hereby incorporated by reference herein and made a part of this specification.

BACKGROUND OF THE INVENTION

Field of the Invention

The invention relates to a display device, and specifically relates to a head-mounted display.

Description of Related Art

Currently, near eye display (NED) and head-mounted display (HMD) are killer products during next generation. They have great potential for development. The NED is currently applied to augmented reality (AR) and virtual reality (VR). In terms of VR, it is important to create realistic in the virtual world in development. In terms of AR, the developers focus on how to provide the best image quality within a thin and light device.

Furthermore, an image light beam used for display is emitted by a projection device in a basic optical structure of a head mounted display that is used to actualize AR, the image light beam is then reflected by a semi-reflective semi-transmission optical device to enter into the user's eyes. The light beam of the display image and the external ambient light beam all enter into the user's eyes to achieve the display effect of AR. However, in the above-mentioned structure, it is inevitable that the projection device appears in field of view (FOV) of user's eyes, and the above component occupies a certain space. Therefore, the viewing angle of the image displayed by the head mounted display is greatly limited. In order to achieve a wide FOV effect, one conventional solution is to reflect the image light beam multiple times based on a group of optical mirrors or a reflection system, thus, the projection device can dispose outside of the FOV of user's eyes. However, the group of optical mirrors or the reflection system usually increases the volume and the weight of the head mounted display, and a plurality of reflective surfaces of the group of optical mirrors requires extremely high precision in assembling and flatness. Otherwise, another conventional solution is to guide the image light beam from the projection device to the user's eyes based on the light guiding member having mutually bonded multilayer light splitting structure. However, the manufacturing process of the light guiding member includes complicated processes such as coating, bonding, alignment, cutting and polishing, consequently. Thus, it is more difficult to produce the light guiding member. Therefore, it is one of the key points to achieve the wide FOV effect that reduce volume and weight of the head mounted display and simplify the manufacturing process at the same time for the people in the related art.

The information disclosed in this "Description of Related Art" section is only for enhancement of understanding of the background of the described technology and therefore it may contain information that does not form the prior art that is already known to a person of ordinary skill in the art. Further, the information disclosed in the "Description of Related Art" section does not mean that one or more problems to be resolved by one or more embodiments of the invention were acknowledged by a person of ordinary skill in the art.

SUMMARY

The invention provides a head-mounted display being able to achieve wide FOV effect and having a smaller volume, a lighter weight, and a simplified manufacturing process.

The other objectives and advantages of the invention can be further understood through the technical features disclosed in the invention.

In order to achieve one of, a part of or all of the above-mentioned advantages, or to achieve other advantages, an embodiment of the invention discloses a head-mounted display including a transparent display, a main liquid crystal lens, and a first liquid crystal lens. The transparent display is adapted to emit an image light beam. The main liquid crystal lens is disposed near the transparent display. The transparent display is disposed between the main liquid crystal lens and the first liquid crystal lens. The first liquid crystal lens is adapted to receive an ambient light beam. The head-mounted display is adapted to allow at least a part of the image light beam emitted from the transparent display passing through a pupil by phase modulating of at least a part of the main liquid crystal lens.

Based on the above, the embodiments of the invention have at least one of the advantages or effects below. In an embodiment of the invention, the transparent display of the head-mounted display is disposed between the main liquid crystal lens and the liquid crystal panel. The transparent display is adapted to emit the image light beam, and the first liquid crystal lens is adapted to receive the ambient light beam. The head-mounted display is adapted to allow at least a part of the image light beam emitted from the transparent display passing through a pupil by the phase modulating of at least a part of the main liquid crystal lens. Therefore, the head-mounted display may emit the image light beam and receive the ambient light beam at the same time, and the phase modulating may occur in a part or in the entirety of the main liquid crystal lens to make the image light beam and the ambient light beam coexist and achieve the AR effect. Since the transparent display does not block the viewing angle, the head-mounted display may achieve wide FOV. Otherwise, the head-mounted display does not need to reflect the image light beam multiple times based on the group of optical mirrors or the reflection system, thus, the volume of the head-mounted display becomes smaller and the weight of the head-mounted display becomes lighter. Besides, the head-mounted display does not need to guide the image beam through the light guiding member having mutually bonded multilayer light splitting structure, therefore, the manufacturing process of the head-mounted display is simplified and it is easier to produce the head-mounted display.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE PREFERRED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. Accordingly, the drawings and descriptions will be regarded as illustrative in nature and not as restrictive.

Figure 1A:
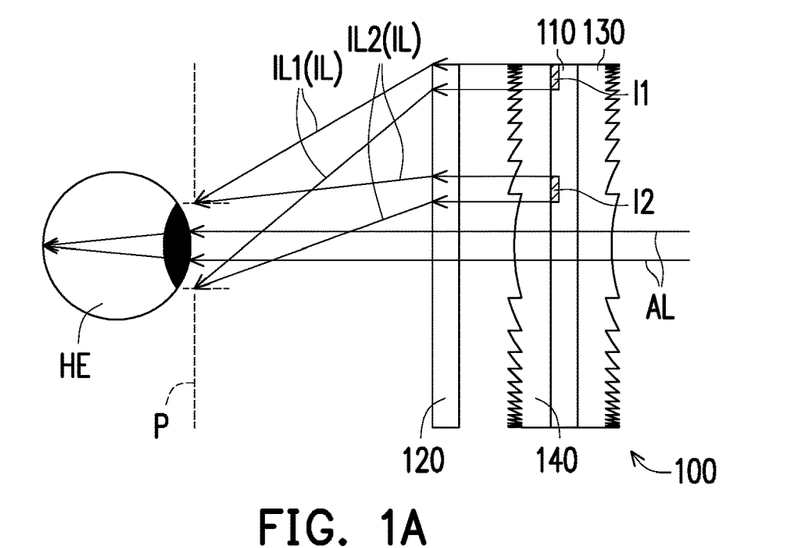
FIG. 1A is a schematic view depicting optical paths of a head-mounted display in an embodiment of the invention.

FIG. 1A is a schematic view depicting optical paths of a head-mounted display in an embodiment of the invention. Referring to FIG. 1A, in the embodiment, a head-mounted display 100 includes a transparent display 110 and a liquid crystal lens 120 disposed near the transparent display 110. To be more specific, the transparent display 110 is configured to emit an image light beam IL. The image light beam IL corresponds to an image signal from a processing device (not shown). The head-mounted display 100 allows at least a part of the image light beam IL emitted from the transparent display 110 passing through a pupil P by the phase modulating of at least a part of the liquid crystal lens 120. For example, the phase modulating occurs in at least a part of the liquid crystal lens 120 of the head-mounted display 100 to make the dioptre become positive so as to allow at least a part of the image light beam IL emitted from the transparent display 110 passing through the pupil P. For example, the phase modulating of the liquid crystal lens means that the arrangement or the direction of the liquid crystal cells in the liquid crystal lens is adjusted by electric power so as to change the direction of the light passed by the liquid crystal lens. The liquid crystal lens can converge/diverge the light according to the adjustable dioptre of the liquid crystal lens. Besides, the degree of the phase modulating means that rotating degree (30 degree or 60 degree) of the direction of the liquid crystal cells, it is not limited thereto. In the embodiment, for example, the pupil P may be the pupil of user's eyes HE. The image light beam IL forms an image on the retina of the user's eyes HE after the image light beam IL passing through the pupil. However, in other embodiments, the pupil P may also be, for example, an aperture of a general optical lens (like camera), the invention is not limited thereto.

In the embodiment, a part of the area of the liquid crystal lens 120 is corresponding to a part of the display area of the transparent display 110. In other words, when the transparent display 110 displays a part of the display area, the liquid crystal lens 120 may be partially modulated in accordance with the display area. Moreover, the phase modulating may also occur in the entire liquid crystal lens 120 to make the image light beam IL passed through the liquid crystal lens 120, and then the image light beam IL passes through the pupil P. To be more specific, the transparent display 110 may emit the image light beam IL to form the corresponding displayed image during the condition that the light transmitting state of the transparent display 110 is kept. Furthermore, at least a part of the ambient light beam AL passes through the transparent display 110, the liquid crystal lens 120 and then passes through the pupil P. In other words, when the pupil P is, for example, the pupil of user's eyes HE, the image light beam IL emitted from the transparent display 110 and at least a part of the ambient light beam AL may all pass through the pupil P, so as to form an image on the retina of user's eyes HE. Therefore, when the head-mounted display 100 is placed in front of the user's eyes HE, both the image light beam IL and the ambient light beam AL may pass through the pupil P of the user's eyes HE and the user may watch a virtual image (not shown in FIG. 1A) formed by the image light beam IL corresponding to the displayed image and watch the image of the outside word (not shown in FIG. 1A) corresponding to the ambient light beam AL at the same time, so as to achieve the augmented reality effect. In the embodiment, the transparent display 110 may be, for example, a thin film transistor-liquid crystal display (TFT-LCD), an organic light-emitting diode (OLED) display, or other types of transparent displays, the invention is not limited thereto.

Referring to FIG. 1A. In the embodiment, the head-mounted display 100 further includes a first Fresnel lens 130 and a second Fresnel lens 140. The transparent display 110 is disposed between the liquid crystal lens 120 and the first Fresnel lens 130, and the transparent display 110 is disposed between the first Fresnel lens 130 and the second Fresnel lens 140. Moreover, in the embodiment, the first Fresnel lens 130 may have a negative dioptre, and the second Fresnel lens 140 may have a positive dioptre. Specifically, the first Fresnel lens 130 is configured to receive the ambient light beam AL. After being received by the first Fresnel lens 130, at least a part of the ambient light beam AL sequentially passes through the transparent display 110, the second Fresnel lens 140, and the liquid crystal lens 120 and then passes through the pupil P. In the embodiment, the transparent display 110 emits the image light beam IL, and the image light beam IL may include an image light beam IL1 and an image light beam IL2, wherein the image light beam IL1 is corresponding to an image display area I1 of the transparent display 110, and the image light beam IL2 is corresponding to an image display area I2 of the transparent display 110. To be more specific, the head-mounted display 100 uses the phase modulating of at least a part of the liquid crystal lens 120 to make the image light beam IL1 and the image light beam IL2 emitted from the transparent display 110 pass through the pupil P. Simultaneously, the ambient light beam AL passes through the transparent display 110 and then passes through the pupil P.

In the embodiment, the second Fresnel lens 140 having positive dioptre and the liquid crystal lens 120 may both adjust the image light beam IL (the image light beam IL1 and the image light beam IL2) emitted from the transparent display 110 to make the adjustable range of the virtual image (not shown in FIG. 1A) formed by the displayed image corresponding to the image light beam IL increase. Moreover, the dioptre of the first Fresnel lens 130 and the dioptre of the second Fresnel lens 140 may be adjusted depending on each other, such that the image light beam IL and the ambient light beam AL are adjusted at the same time. For example, the first Fresnel lens 130 may have a negative dioptre, the second Fresnel lens 140 may have a positive dioptre, and all of the first Fresnel lens 130, the second Fresnel lens 140 and the liquid crystal lens 120 may simultaneously adjust the image light beam IL and the ambient light beam AL. The image light beam IL is able to pass through the pupil P after the image light beam IL sequentially passes through the second Fresnel lens 140 and the liquid crystal lens 120. Simultaneously, the ambient light beam AL does not diverge or converge so as to prevent the image of the outside world corresponding to the ambient light beam AL from being distorted after at least a part of the ambient light beam AL sequentially passes through the first Fresnel lens 130, the transparent display 110, the second Fresnel lens 140, and the liquid crystal lens 120.

In some embodiments, the head-mounted display 100 may not include the second

Fresnel lens 140. The first Fresnel lens 130 of the head-mounted display 100 also has negative dioptre. In these embodiments, the dioptre of the liquid crystal lens 120 modulated by phase modulating and the dioptre of the first Fresnel lens 130 may be adjusted with each other to prevent the image of the outside world corresponding to the ambient light beam AL from being distorted, the invention is not limited thereto. In other embodiments, the dioptre of the first Fresnel lens 130, the dioptre of the second Fresnel lens 140, and the dioptre of the liquid crystal lens 120 modulated by phase modulating may be adjusted, so as to adjust the displayed image corresponding to the image light beam IL and the image of the outside world corresponding to ambient light beam AL. Otherwise, in some embodiments, other types of lenses may also be adopted, for example, a liquid crystal lens, a general lens, or a lens group may be adopted to replace the first Fresnel lens 130 or the second Fresnel lens 140, the invention is also not limited thereto.

In the embodiment, the head-mounted display 100 allows at least a part of the image light beam IL emitted from the transparent display 110 passing through a pupil P by phase modulating of at least a part of the liquid crystal lens 120. Therefore, the head-mounted display 100 may emit the image light beam for displaying and receive the external ambient light beam simultaneously. Furthermore, the phase modulating may occur in a part or in the entirety of the liquid crystal lens 120 to make the image light beam IL used for displaying and the ambient light beam AL from the outside world coexist and achieve the AR effect. Otherwise, since the transparent display 110 does not block the viewing angle, the head-mounted display 100 may achieve wide FOV effect. In addition, the head-mounted display 100 does not need to mount additional optical mirrors group or reflection system that is able to reflect the image light beam multiple times, thus, the volume of the head-mounted display 100 becomes smaller and the weight of the head-mounted display 100 becomes lighter. Besides, the head-mounted display 100 does not need to mount light guiding members having mutually bonded multilayer light splitting structure, therefore, the manufacturing process of the head-mounted display 100 is simplified and is easier to produce the head-mounted display 100 so as to reduce manufacturing cost. In the embodiment, the head-mounted display 100 includes the first Fresnel lens 130, and the transparent display 110 is disposed between the liquid crystal lens 120 and the first Fresnel lens 130. Therefore, the dioptre of the liquid crystal lens 120 modulated by phase modulating and the dioptre of the first Fresnel lens 130 may be adjusted with each other to prevent the image of the outside world corresponding to the ambient light beam AL from being distorted. In other words, the head-mounted display 100 may simultaneously display the image from the transparent display 110 and the image of the outside world corresponding to the ambient light beam AL, and the image of the outside world corresponding to the ambient light beam AL is not distorted, so as to achieve the ideal AR effect.

In some embodiments, the transparent display 110 of the head-mounted display 100 may be designed to have a curved-surface shape, and other components of the head-mounted display 100, such as the liquid crystal lens 120, the first Fresnel lens 130, and the second Fresnel lens 140, may also be designed to have a curved-surface shape correspondingly, so as to make the head-mounted display 100 provide a better coverage ratio. Otherwise, in some embodiments, the transparent display 110 and the liquid crystal lens 120 may also be adjusted so that two image light beams emitted by the transparent display 110 pass through two pupils respectively, wherein each of the image light beams passes through one respective pupil. When the two pupils are respectively corresponding to two pupils of two eyes of the user, the user can see three-dimensional display effect via the appropriate design of the transparent display 110 and the liquid crystal lens 120. In these embodiments, the head-mounted display 100 may provide a better three-dimensional AR effect for the user.

Figure 1B:
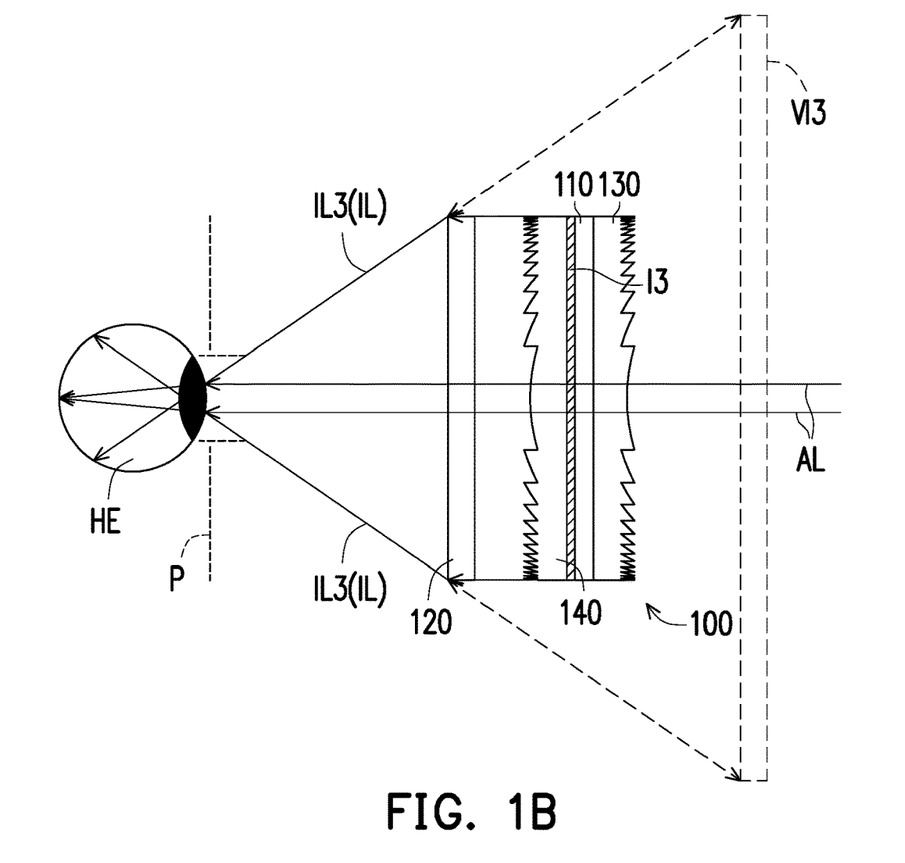
FIG. 1B is another schematic view depicting optical paths of the head-mounted display in the embodiment in FIG. 1A.

FIG. 1B is another schematic view depicting optical paths of the head-mounted display in the embodiment in FIG. 1A. Referring to FIG. 1B, in the embodiment, the image light beam IL emitted from the transparent display 110 includes an image light beam IL3, and the image light beam IL3 is corresponding to the image display area I3. The phase modulating may occur in the entire liquid crystal lens 120 of the head-mounted display 100 to allow the image light beam IL3 (the image light beam IL) passing through the liquid crystal lens 120 passing through the pupil P. When the pupil P is, for example, the pupil of user's eyes HE, the user may watch a virtual image VI3 formed by the image light beam IL3 (i.e., the image light beam IL) corresponding to the image display area I3. Simultaneously, the user may watch the image of the outside world (not shown in FIG. 1B) correspondingly formed by the ambient light beam AL. In the embodiment, the phase modulating occurs in the entire liquid crystal lens 120, and the phase of the liquid crystal lens 120 is continuously modulated. Therefore, the image light beam IL3 emitted from the edge of the transparent display 110 to the center of the transparent display 110 may all pass through the pupil P. However, in other embodiments, the phase of the liquid crystal lens 120 may not be continuously modulated, the invention is not limited thereto.

Figure 2:
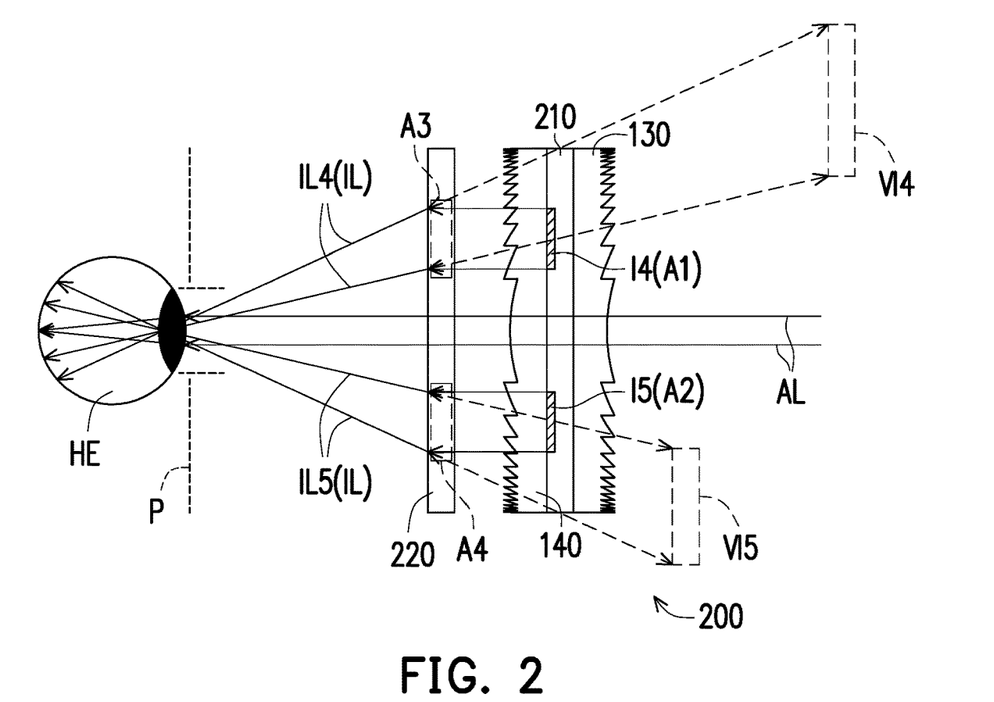
FIG. 2 is a schematic view depicting optical paths of a head-mounted display in another embodiment of the invention.

FIG. 2 is a schematic view depicting optical paths of a head-mounted display in another embodiment of the invention. Referring to FIG. 2, in the embodiment, a head-mounted display 200 is similar to the head-mounted display 100 in FIG. 1A and FIG. 1B. The elements and the related description of the head-mounted display 200 are similar to the head-mounted display 100 in FIG. 1A and FIG. 1B, and will not be repeated. The differences between the head-mounted display 200 and the head-mounted display 100 are described as followings. The head-mounted display 200 includes a transparent display 210, a liquid crystal lens 220, the first Fresnel lens 130, and the second Fresnel lens 140. The transparent display 210 is configured to emit the image light beam IL, and the image light beam IL further includes an image light beam IL4 and an image light beam IL5, wherein the image light beam IL4 is corresponding to an image display area I4, and the image light beam IL5 is corresponding to an image display area I5. In addition, the transparent display 210 has a first area A1 and a second area A2, and the liquid crystal lens 220 has a third area A3 and a fourth area A4, wherein the first area A1 of the transparent display 210 is corresponding to the image display area I4 and the second area A2 of the transparent display 210 is corresponding to the image display area I5.

In the embodiment, the phase modulating of the third area A3 of the liquid crystal lens 220 changes the optical path of the image light beam IL4 emitted from the first area A1 when the image light beam IL4 passes through the third area A3. Moreover, the phase modulating of the fourth area A4 of the liquid crystal lens 220 changes the optical path of the image light beam IL5 emitted from the second area A2 when the image light beam IL5 passes through the fourth area A4. Specifically, the first area A1 emits the image light beam IL4, and when the image light beam IL4 corresponding to the image display area I4 passes through the third area A3, the phase modulating occurs in the third area A3 of the liquid crystal lens 220 to change the direction of the image light beam IL4 and converge the image light beam IL4 to pass through the pupil P. In addition, the second area A2 emits the image light beam IL5, and when the image light beam IL5 corresponding to the image display area I5 passes through the fourth area A4, the phase modulating occurs in the fourth area A4 of the liquid crystal lens 220 to change the direction of the image light beam IL5 and converge the image light beam IL5 to pass through the pupil P. In other words, in the embodiment, the image light beam IL4 passing through the third area A3 and the image light beam IL5 passing through the fourth area A4 pass through the pupil P simultaneously.

In the embodiment, the phase modulating in the liquid crystal lens 220 is not continuous. When the pupil P is, for example, the pupil of user's eyes HE, the user may watch a virtual image VI4 formed by the image display area I4 and a virtual image VI5 formed by the image display area I5. To be more specific, the degree of phase modulating of the third area A3 in the liquid crystal lens 220 is different from the degree of phase modulating of the fourth area A4 in the liquid crystal lens 220 so that the virtual image VI4 and the virtual image VI5 are located at different locations. Furthermore, the user can observe that the virtual image VI4 corresponding to the first area A1 and the virtual image VI5 corresponding to the second area A2 have different depths of focus. In other words, the displayed image of the head-mounted display 200 may have a depth of field effect due to the phase modulating in the liquid crystal lens 220 is not continuous. Otherwise, the head-mounted display 200 in the embodiment and the head-mounted display 100 in the embodiment depicted in FIG. 1A to FIG. 1B have similar technical features. The head-mounted display 200 may achieve wide FOV and have a smaller volume, a lighter weight, and a simplified manufacturing process.

Figure 3A:
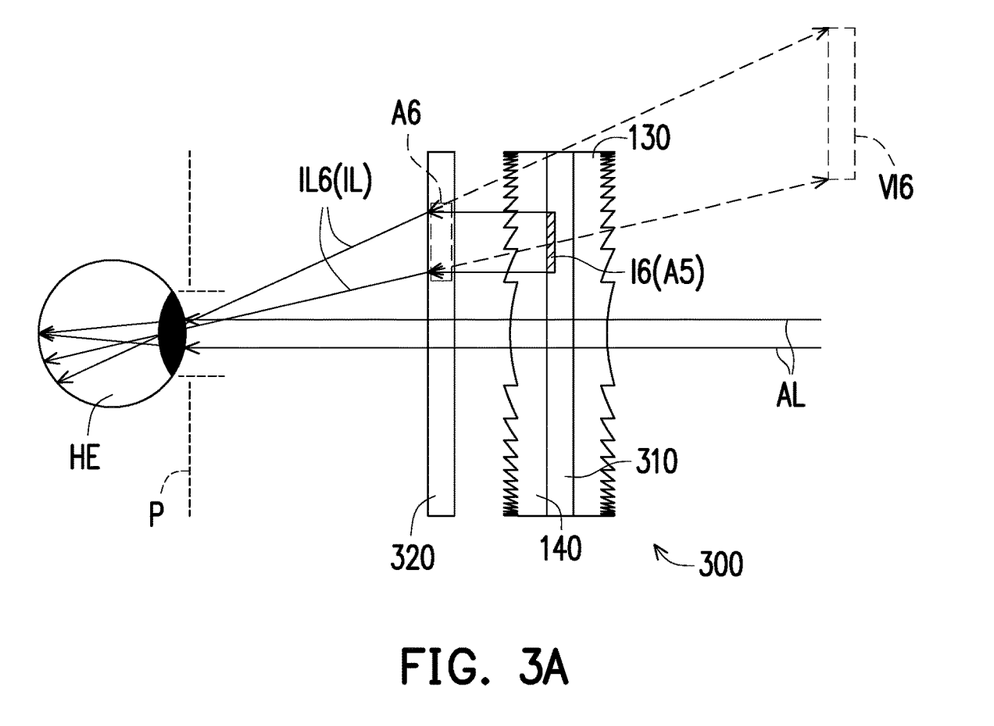
FIG. 3A is a schematic view depicting optical paths of a head-mounted display in another embodiment of the invention.
Figure 3B:
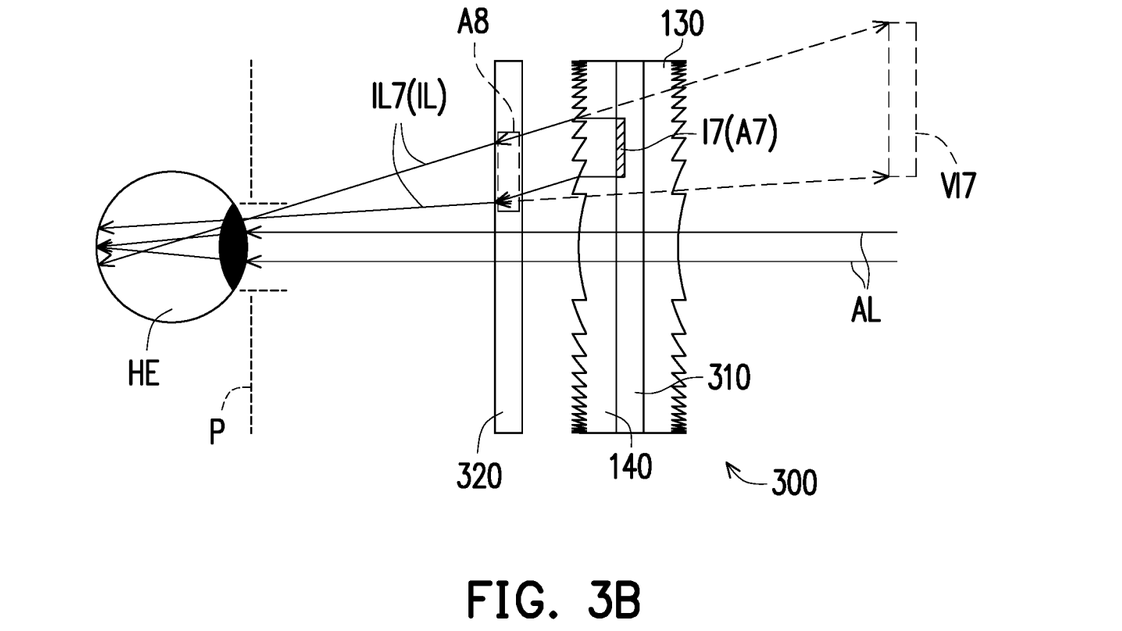
FIG. 3B is another schematic view depicting optical paths of the head-mounted display in the embodiment in FIG. 3A.

FIG. 3A is a schematic view depicting optical paths of a head-mounted display in another embodiment of the invention, FIG. 3B is another schematic view depicting optical paths of the head-mounted display in the embodiment in FIG. 3A. Referring to FIG. 3A, in the embodiment, a head-mounted display 300 is similar to the head-mounted display 100 in FIG. 1A and FIG. 1B. The elements and the related description of the head-mounted display 300 may refer to the head-mounted display 100 in FIG. 1A and FIG. 1B, and will not be repeated. The differences between the head-mounted display 300 and the head-mounted display 100 are described as followings. The head-mounted display 300 includes a transparent display 310, a liquid crystal lens 320, the first Fresnel lens 130, and the second Fresnel lens 140. The transparent display 310 is configured to emit the image light beam IL, and the image light beam IL includes an image light beam IL6, wherein the image light beam IL6 is corresponding to an image display area I6. In addition, the transparent display 310 has a first area A5 and the liquid crystal lens 320 has a second area A6, wherein the first area A5 of the transparent display 310 displays the image display area I6. In the embodiment, the phase modulating of the second area A6 of the liquid crystal lens 320 allows the image light beam IL6 emitted from the first area A5 of the transparent display 310 passing through the second area A6 and then the image light beam IL6 passes through the pupil P. To be more specific, the location of the first area A5 is corresponding to the location of the second area A6.

Next, referring to FIG. 3B. In the embodiment, the transparent display 310 has a first area A7 and the liquid crystal lens 320 has a second area A8, wherein the first area A7 of the transparent display 310 displays the image display area I7. In the embodiment, the phase changing of the second area A8 of the liquid crystal lens 320 allows the image light beam IL7 emitted from the first area A7 of the transparent display 310 passing through the second area A8 and then the image light beam IL7 passes through the pupil P. Specifically, the location of the first area A7 is not corresponding to the location of the second area A8, and an asymmetrical opening angle is formed when the image light beam IL7 passes through the pupil P. Referring to FIG. 3A and FIG. 3B simultaneously, in the embodiment, the first area A5 in FIG. 3A and the first area A7 in FIG. 3B may be located at the same location in the transparent display 310. Within a time sequence, the phase modulating that occurs in the second area A6 of the liquid crystal lens 320 (as shown in FIG. 3A) is gradually transformed to the phase modulating that occurs in the second area A8 (as shown in FIG. 3B). In other words, the area of the liquid crystal lens 320 in which the phase modulating occurs is gradually changed within a time sequence so that the area of the liquid crystal lens 320 in which the phase modulating occurs affects the image light beam emitted by the transparent display 310 to form different imaging effects. The area of the liquid crystal lens 320 corresponding to the displayed image of the transparent display 310 in which the phase modulating occurs is transformed to the area that is not corresponding to the displayed image of the transparent display 310, and the area of the liquid crystal lens 320 in which the phase modulating occurs is gradually changed within a time sequence. In FIG. 3A, the user may watch a virtual image VI6 formed by the image display area I6 in FIG. 3A, and the user may watch a virtual image VI7 formed by the image display area I7 in FIG. 3B. To be more specific, since the asymmetrical opening angle is formed when the image light beam IL7 passes through the pupil P, the user feels like the displayed image of the head-mounted display 300 is moving when watching the displayed image of the head-mounted display 300 transforming from the virtual image VI6 to the virtual image VI7. The head-mounted display 300 in the embodiment and the head-mounted display 100 in the embodiment depicted in FIG. 1A to FIG. 1B have similar technical features. The head-mounted display 300 may achieve wide FOV effect and have a smaller volume, a lighter weight, and a simplified manufacturing process.

Figure 4A:
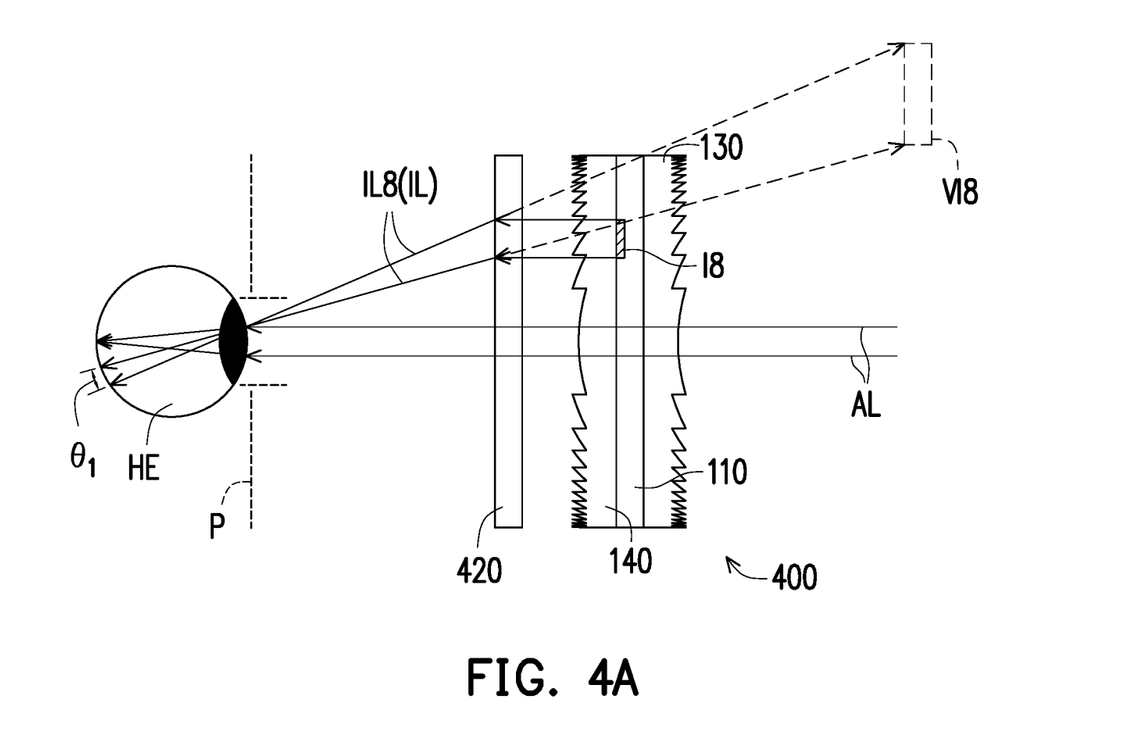
FIG. 4A is a schematic view depicting optical paths of a head-mounted display in another embodiment of the invention.
Figure 4B:
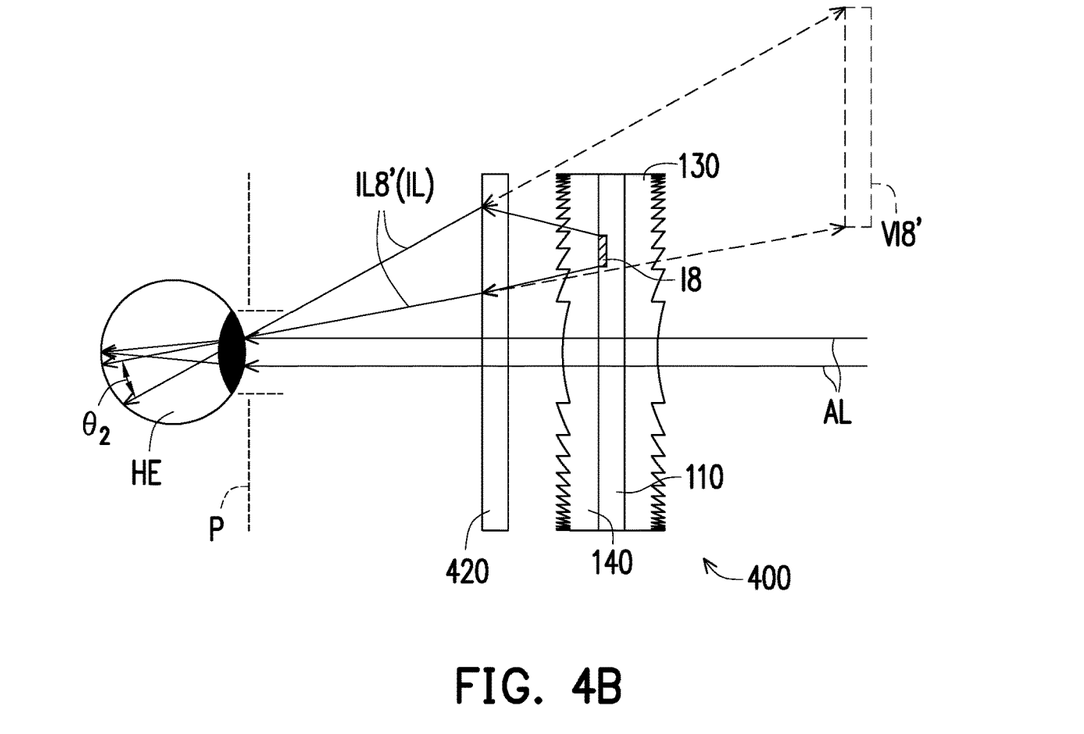
FIG. 4B is another schematic view depicting optical paths of the head-mounted display in the embodiment in FIG. 4A.

FIG. 4A is a schematic view depicting optical paths of a head-mounted display in another embodiment of the invention, and FIG. 4B is another schematic view depicting optical paths of the head-mounted display in the embodiment in FIG. 4A. Referring to FIG. 4A, in the embodiment, a head-mounted display 400 is similar to the head-mounted display 100 in FIG. 1A and FIG. 1B. The elements and the related description of the head-mounted display 400 may refer to the head-mounted display 100 in FIG. 1A and FIG. 1B, and will not be repeated. The differences between the head-mounted display 400 and the head-mounted display 100 are described as followings. The head-mounted display 400 includes a transparent display 110, a liquid crystal lens 420, the first Fresnel lens 130, and the second Fresnel lens 140. In the embodiment, the transparent display 110 is configured to emit an image light beam IL, and the image light beam IL includes an image light beam IL8, wherein the image light beam IL8 is corresponding to an image display area I8. When the pupil P is, for example, the pupil of user's eyes HE, the user may watch a virtual image VI8 formed by the image light beam IL8 (the image light beam IL) corresponding to the image display area I8.

In the embodiment, the head-mounted display 400 adjusts the opening angle of the image light beam passing through the pupil P via adjusting the degree of phase modulating of at least a part of the liquid crystal lens 420. To be more specific, please refer to FIG. 4A and FIG. 4B simultaneously. In FIG. 4A, the image light beam IL8 passing through the pupil P is corresponding to the image display area I8, and the image light beam IL8 has an opening angle $\theta_1$ to form an image on the retina. When the opening angle increases, the image may expand on the retina. Subsequently, in FIG. 4B, a greater degree of light convergence of the liquid crystal lens 420 in the head-mounted display 400 is achieved to increase the opening angle of the image light beam passing through the pupil P via adjusting the degree of phase modulating of at least a part of the liquid crystal lens 420. To be more specific, in FIG. 4B, the image light beam IL8' passing through the pupil P is corresponding to the image display area I8, a virtual image VI8' is also corresponding to the image display area I8. The image light beam IL8' has an opening angle $\theta_2$, and the opening angle $\theta_2$ is greater than the opening angle $\theta_1$ of the FIG. 4A. At this time, the user may observe that the virtual image VI8' is greater than the virtual image VI8. In other words, in the embodiment, the head-mounted display 400 enlarges the displayed image of the transparent display 110 via adjusting the degree of phase modulating of at least a part of the liquid crystal lens 420. In other embodiments, the degree of phase modulating of at least a part of the liquid crystal lens 420 in the head-mounted display 400 is adjusted to affect the displayed image of the transparent display so as to form other display effects, such as image reduction or image translation, etc., the invention is not limited thereto. To be more specific, the head-mounted display 400 in the embodiment and the head-mounted display 100 in the embodiment depicted in FIG. 1A to FIG. 1B have similar technical features. The head-mounted display 400 may achieve wide FOV and have a smaller volume, a lighter weight, and a simplified manufacturing process.

Figure 5:
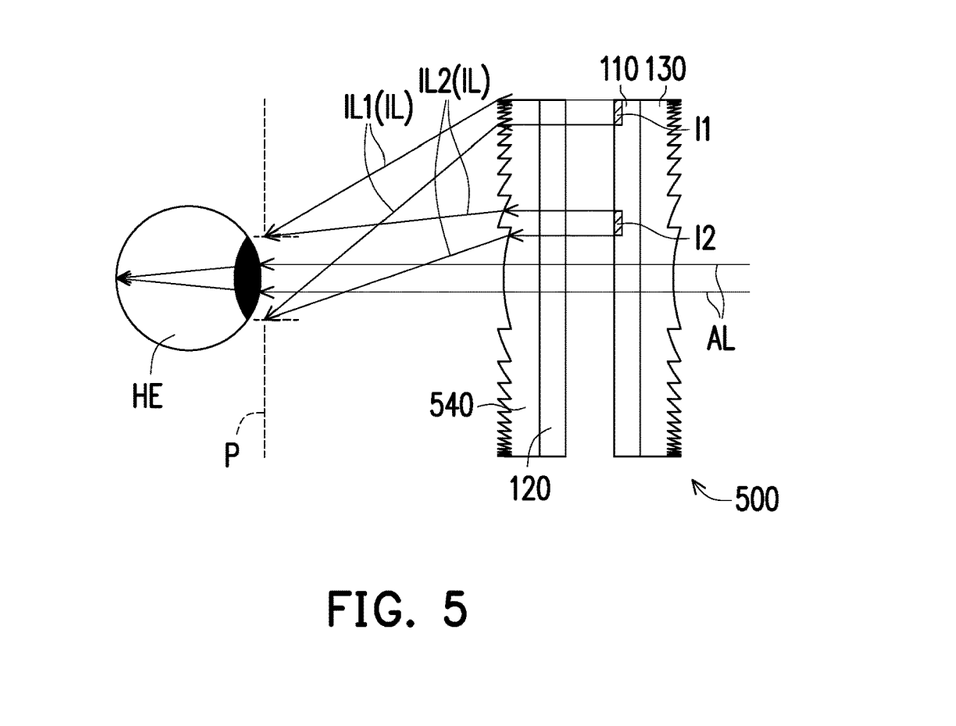
FIG. 5 is a schematic view depicting optical paths of a head-mounted display in another embodiment of the invention.

FIG. 5 is a schematic view depicting optical paths of a head-mounted display in another embodiment of the invention. Referring to FIG. 5, in the embodiment, a head-mounted display 500 is similar to the head-mounted display 100 in FIG. 1A and FIG. 1B. The elements and the related description of the head-mounted display 500 may refer to the head-mounted display 100 in FIG. 1A and FIG. 1B, and will not be repeated. The differences between the head-mounted display 500 and the head-mounted display 100 are described as followings. The head-mounted display 500 includes the transparent display 110, the liquid crystal lens 120, the first Fresnel lens 130, and a second Fresnel lens 540. Specifically, the liquid crystal lens 120 is disposed between the transparent display 110 and the second Fresnel lens 540, and at least a part of the ambient light beam AL received by the first Fresnel lens 130 sequentially passes through the transparent display 110, the liquid crystal lens 120, the second Fresnel lens 540 and then passes through the pupil P. In the present embodiment, since the second Fresnel lens 540 is not directly disposed beside the transparent display 110, the second Fresnel lens 540 is not so close to the transparent display 110 that the user may not watch the second Fresnel lens 540. To be more specific, the user can watch the image displayed by the transparent display 110 but not watch the appearance of the second Fresnel lens 540 at the same time because the second Fresnel lens 540 is not close to the transparent display 110. The head-mounted display 500 in the embodiment and the head-mounted display 100 in the embodiment depicted in FIG. 1A to FIG. 1B have similar technical features. The head-mounted display 500 may achieve wide FOV and have a smaller volume, a lighter weight, and a simplified manufacturing process.

Figure 6:
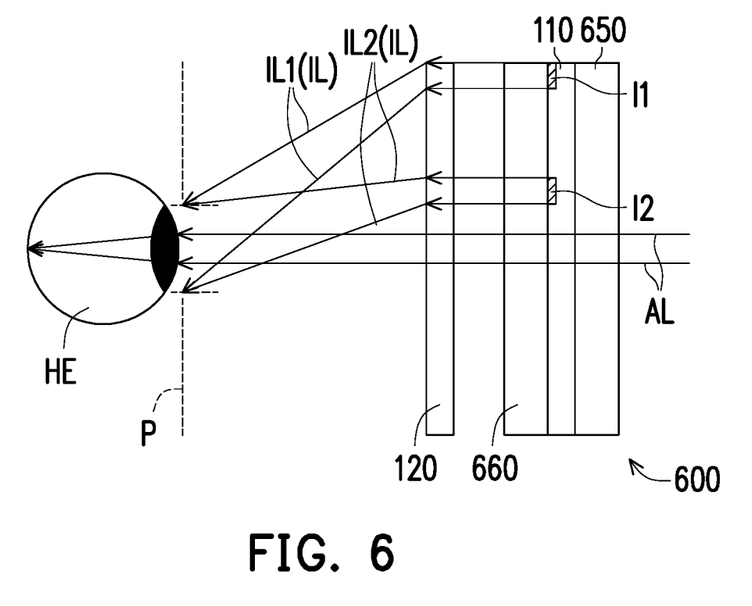
FIG. 6 is a schematic view depicting optical paths of a head-mounted display in another embodiment of the invention.

FIG. 6 is a schematic view depicting optical paths of a head-mounted display in another embodiment of the invention. Referring to FIG. 6, in the embodiment, a head-mounted display 600 is similar to the head-mounted display 100 in FIG. 1A and FIG. 1B. The elements and the related description of the head-mounted display 600 may refer to the head-mounted display 100 in FIG. 1A and FIG. 1B, and may not be repeated. The differences between the head-mounted display 600 and the head-mounted display 100 are described as followings. The head-mounted display 600 comprises the transparent display 110, the main liquid crystal lens 120, a first liquid crystal lens 650 and a second liquid crystal lens 660. In the head-mounted display 600, a first liquid crystal lens 650 and a second liquid crystal lens 660 are adopted to replace the first Fresnel lens 130 and the second Fresnel lens 140 respectively. In the embodiment, the first liquid crystal lens 650 and the second liquid crystal lens 660 may achieve an appropriate dioptre via phase modulating. For example, the first liquid crystal lens 650 has a negative dioptre by the phase modulating, and the second liquid crystal lens 660 has a positive dioptre by the phase modulating. The head-mounted display 600 in the embodiment and the head-mounted display 100 in the embodiment depicted in FIG. 1A and FIG. 1B have similar technical features. The head-mounted display 600 may achieve wide FOV and have a smaller volume, a lighter weight, and a simplified manufacturing process.

Figure 7:
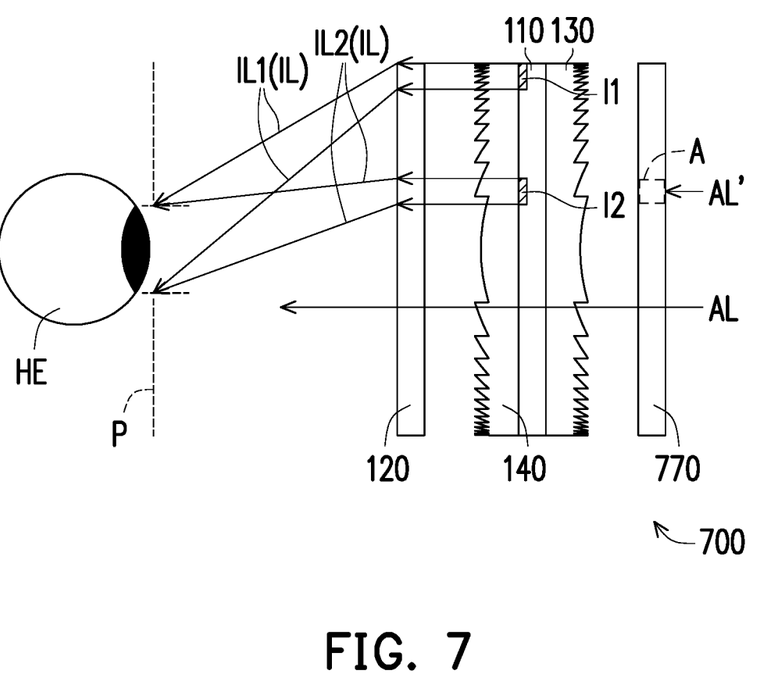
FIG. 7 is a schematic view depicting optical paths of a head-mounted display in another embodiment of the invention.

FIG. 7 is a schematic view depicting optical paths of a head-mounted display in another embodiment of the invention, referring to FIG. 7. In the embodiment, a head-mounted display 700 is similar to the head-mounted display 100 in FIG. 1A and FIG. 1B. The elements and the related description of the head-mounted display 700 may refer to the head-mounted display 100 in FIG. 1A and FIG. 1B, and will not be repeated. The differences between the head-mounted display 700 and the head-mounted display 100 are described as followings. The head-mounted display 700 further includes a liquid crystal panel 770, and the transparent display 110 is disposed between the liquid crystal lens 120 and the liquid crystal panel 770. By the phase modulating of the liquid crystal panel 770, at least a part of the liquid crystal panel 770 blocks the ambient light beam to pass through. To be more specific, the phase modulating occurs in an area A of the liquid crystal panel 770 so that a part of the ambient light beam AL' is unable to pass through the area A. In contrast, except the area A, the phase modulating does not occur in the remaining area of the liquid crystal panel 770. Therefore, the ambient light beam AL may successfully pass through the remaining area of the liquid crystal panel 770. In the embodiment, the location of the area A may be corresponding to the image display area of the transparent display 110, for example, the location of the area A is corresponding to the location of the image display area I2. When the user watch the virtual image (not shown) formed by the image light beam IL2 (the image light beam IL) corresponding to the image display area I2, the virtual image formed by the image light beam IL2 is not overlapped with the image of the outside world (not shown in FIG. 7) corresponding to the ambient light beam AL'. Therefore, the image of the outside world corresponding to the ambient light beam AL' does not interfere with the virtual image formed by the image light beam IL2 so that a more distinct display effect is achieved when the user watches the virtual image corresponding to the image display area I2. In contrast, since the ambient light beam AL may successfully pass through the area of the liquid crystal panel 770 except the area A, when the user watch the virtual image (not shown in FIG. 7) formed by the image light beam IL1 (the image light beam IL) corresponding to the image display area I1, the virtual image formed by the image light beam IL1 is overlapped with the image of the outside world corresponding to the ambient light beam AL. To be more specific, by the phase modulating of the liquid crystal panel 770, at least a part of the liquid crystal panel 770 blocks the ambient light beam to pass according to actual requirements. In some embodiments, the phase modulating may also occur in the entire liquid crystal panel 770 to prevent the ambient light beam from passing through, such that the user cannot see the ambient light beam corresponding to the image of the outside world when the user wears the head-mounted display. At the same time, the head-mounted display may achieve the VR effect. The head-mounted display 700 in the embodiment and the head-mounted display 100 in the embodiment depicted in FIG. 1A and FIG. 1B have similar technical features. The head-mounted display 700 may achieve wide FOV and have a smaller volume, a lighter weight, and a simplified manufacturing process.

In summary, the embodiments of the invention have at least one of the advantages or effects below. In an embodiment of the invention, the transparent display of the head-mounted display is disposed between the liquid crystal lens and the first Fresnel lens. The transparent display is configured to emit the image light beam, and the first Fresnel lens is configured to receive the ambient light beam. The head-mounted display uses the phase modulating of at least a part of the liquid crystal lens to allow at least a part of the image light beam emitted from the transparent display passing through a pupil. Therefore, the head-mounted display may emit the image light beam used for displaying and receive the external ambient light beam at the same time, and the phase modulating may occur in a part or in entire of the liquid crystal lens to allow the image light beam used for displaying and the external ambient light beam coexist and achieve the AR effect. Since the transparent display does not cause the problem that the viewing angle is blocked, the head-mounted display may achieve wide FOV. Otherwise, the head-mounted display does not need to reflect the image light beam multiple times based on the group of optical mirrors or the reflection system, thus, the volume of the head-mounted display becomes smaller and the weight of the head-mounted display becomes lighter. Besides, the head-mounted display does not need to guide the image beam through the light guiding member having mutually bonded multilayer light splitting structure, therefore, the manufacturing process of the head-mounted display is simplified and it is easier to produce the head-mounted display.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, "first", "second", "third", "fourth" etc. mentioned in the specification and the claims are merely used to name the elements and should not be regarded as limiting the upper or lower bound of the number of the components/devices.

What is claimed is:

1. A head-mounted display, comprising:
   a transparent display, configured to emit an image light beam;
   a main liquid crystal lens, disposed near the transparent display; and
   a first liquid crystal lens, wherein the transparent display is disposed between the main liquid crystal lens and the first liquid crystal lens, the first liquid crystal lens is adapted to receive an ambient light beam, and wherein the head-mounted display is adapted to allow at least a part of the image light beam emitted from the transparent display passing through a pupil by phase modulating of at least a part of the main liquid crystal lens.

2. The head-mounted display as recited in claim 1, wherein the transparent display comprises a first area, and the main liquid crystal lens comprises a third area, and the phase modulating of the third area of the main liquid crystal lens makes the image light beam emitted from the first area of the transparent display pass through the third area of the main liquid crystal lens, and then the image light beam passes through the pupil, wherein a location of the first area is corresponding to a location of the third area.

3. The head-mounted display as recited in claim 1, wherein the transparent display comprises a first area, and the main liquid crystal lens comprises a third area, and the phase modulating of the third area of the main liquid crystal lens makes the image light beam emitted from the first area of the transparent display pass through the third area of the main liquid crystal lens and then the image light beam passes through the pupil, wherein a location of the first area is not corresponding to a location of the third area.

4. The head-mounted display as recited in claim 1, wherein the phase modulating of the main liquid crystal lens is continuous.

5. The head-mounted display as recited in claim 1, wherein the transparent display has a first area and a second area, and the main liquid crystal lens has a third area and a fourth area, the phase modulating of the third area of the main liquid crystal lens changes optical path of the image light beam emitted from the first area when the image light beam passes through the third area, the phase modulating of the fourth area of the main liquid crystal lens changes optical path of the image light beam emitted from the second area when the image light beam passes through the fourth area, wherein the image light beam passing through the third area and the image light beam passing through the fourth area pass through the pupil.

6. The head-mounted display as recited in claim 5, wherein a degree of phase modulating of the third area of the main liquid crystal lens is different from a degree of phase modulating of the fourth area of the main liquid crystal lens.

7. The head-mounted display as recited in claim 1, wherein an opening angle of the image light beam passing through the pupil is adjusted by adjusting a degree of phase modulating of at least a part of the main liquid crystal lens.

8. The head-mounted display as recited in claim 1, wherein the first liquid crystal lens is adapted to receive the ambient light beam, and at least a part of the ambient light beam passes through the transparent display and the pupil.

9. The head-mounted display as recited in claim 1, wherein the first liquid crystal lens has a negative dioptre.

10. The head-mounted display as recited in claim 1, further comprising a second liquid crystal lens, wherein the second liquid crystal lens has a positive dioptre, the transparent display is disposed between the first liquid crystal lens and the second liquid crystal lens, and at least a part of the ambient light beam passing through the first liquid crystal lens sequentially passes through the transparent display, the second liquid crystal lens, the main liquid crystal lens and the pupil.

11. The head-mounted display as recited in claim 1, further comprising a second liquid crystal lens, wherein the second liquid crystal lens has a positive dioptre, the main liquid crystal lens is disposed between the transparent display and the second liquid crystal lens, and at least a part of the ambient light beam passing the first liquid crystal lens sequentially passes through the transparent display, the main liquid crystal lens, the second liquid crystal lens and the pupil.

12. The head-mounted display as recited in claim 1, further comprising a liquid crystal panel, wherein the transparent display is disposed between the main liquid crystal lens and the liquid crystal panel, and the ambient light beam is blocked by at least a part of the liquid crystal panel according to the phase modulating of the liquid crystal panel.

* * * * *